Patented Mar. 11, 1941

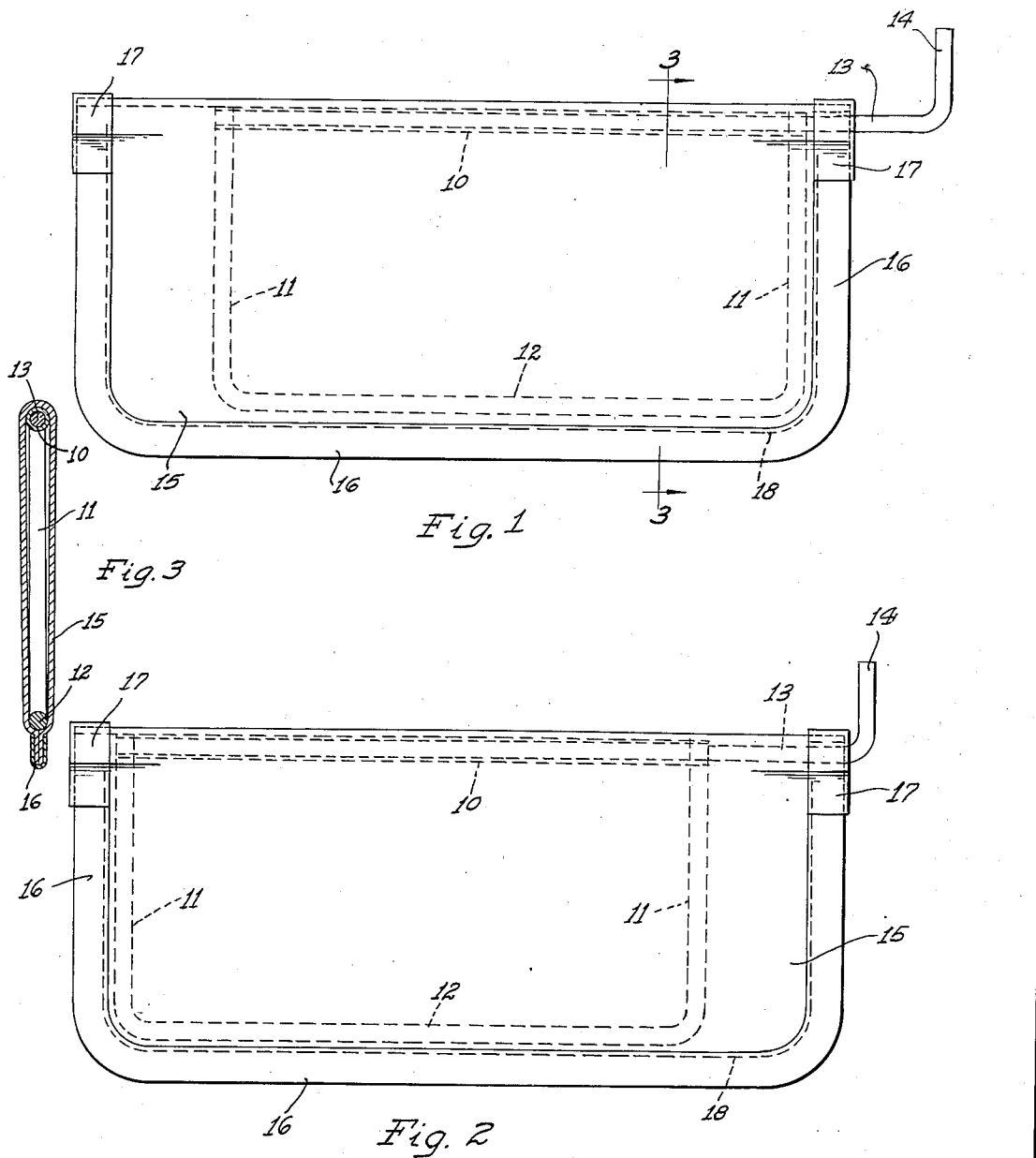

2,234,284

UNITED STATES PATENT OFFICE 2,234,284

VISOR

Albert J. Schoenheit, Detroit, Mich., assignor, by mesne assignments, to Reconstruction Finance Corporation, Detroit, Mich., a corporation of United States Application July 28, 1939, Serial No. 287,107

2 Claims. (Cl. 296—97)

This invention relates generally to visors or glare shields and more particularly to adjustable visors or glare shields for motor vehicles.

It is an object of the present invention to provide a new and improved visor or glare shield which is adjustable about the axis of a support and also adjustable along the axis of the support and to provide a device of this character which is very inexpensive to manufacture.

Other objects of the invention will appear from the following description taken with the accompanying sheet of drawings in which—

Figure 1 is a view in elevation of an adjustable visor or glare shield for motor vehicles;

Fig. 2 is a view similar to Fig. 1, showing the shield in another position of adjustment; and Fig. 3 is a transverse sectional view of the shield taken along the line 3—3 of Fig. 1.

Referring to the drawing by characters of reference, the present glare shield includes a substantially rectangular frame having along its upper edge an open ended tube 10 from which depend spaced side frame members 11 which join or are integral with a lower frame member 12, parallel with the tube 10. The tube 10 receives an end portion of a supporting rod 13 which is bent, as at 14, for attachment to a bracket (not shown) by means of which the glare shield may be mounted above the windshield of a motor vehicle. The supporting rod 13 may tightly fit in the shield frame tube 10 such that the shield may be moved to any position of adjustment about the axis of the rod and held in such position by the friction between the rod and tube.

The frame is enclosed by the shield panel 15 which may be opaque and may be a suitable fabric or cardboard or other suitable composition bound along the side and lower edges by a suitable binding strip 16 which may be stitched, as at 18. At the upper corners of the panel 15 tubular clips 17 are preferably provided to give a finished appearance to the structure.

In order to provide a glare shield panel which is adjustable longitudinally of the rod portion 13, I make the panel longer than the frame and wrap the panel loose enough around the frame such that the panel may be slid along the frame. For example, in Fig. 1, the panel is shown slid as far as it can go to the left on the frame. In the event that light should be bothering a motorist, left of the shield, it will be seen that the shield panel can be easily and readily shifted to the left to block out the glare.

From the above it will be seen that I have provided a glare shield which may be easily adjusted as to position to thus meet all requirements without being unduly long. It will further be seen that I have obtained the above mentioned desired result in a very simple and inexpensive manner.

While I have shown and described my invention in detail it is to be understood that the same is to be limited only by the appended claims for many changes may be made without departing from the spirit and scope of the invention.

What I claim is:

1. A glare shield structure comprising, a supporting rod, a frame having a tube receiving said rod, said frame being movably adjustable about the longitudinal axis of said rod, and a hollow panel enclosing said frame and surrounding said rod, said panel being movable with said frame about the longitudinal axis of said rod, said panel also being shiftable relative to said frame longitudinally of said rod and limited in movement by engagement with the opposite ends of said panel.

2. A glare shield structure comprising, a supporting rod, a substantially rectangular frame having a longitudinal tubular frame member receiving said supporting rod, said frame member being movable relative to said rod about the longitudinal axis thereof and arranged to hold frictionally said frame in an adjusted position, and a substantially rectangular panel loosely wrapped around and entirely closing said frame, said panel being longer than said frame and arranged to be shifted longitudinally thereof to desired positions of adjustment.

ALBERT J. SCHOENHEIT.